March 19, 1929. N. H. MASSIE 1,705,936
FRUIT VENDING MACHINE
Filed Dec. 13, 1927 3 Sheets-Sheet 1
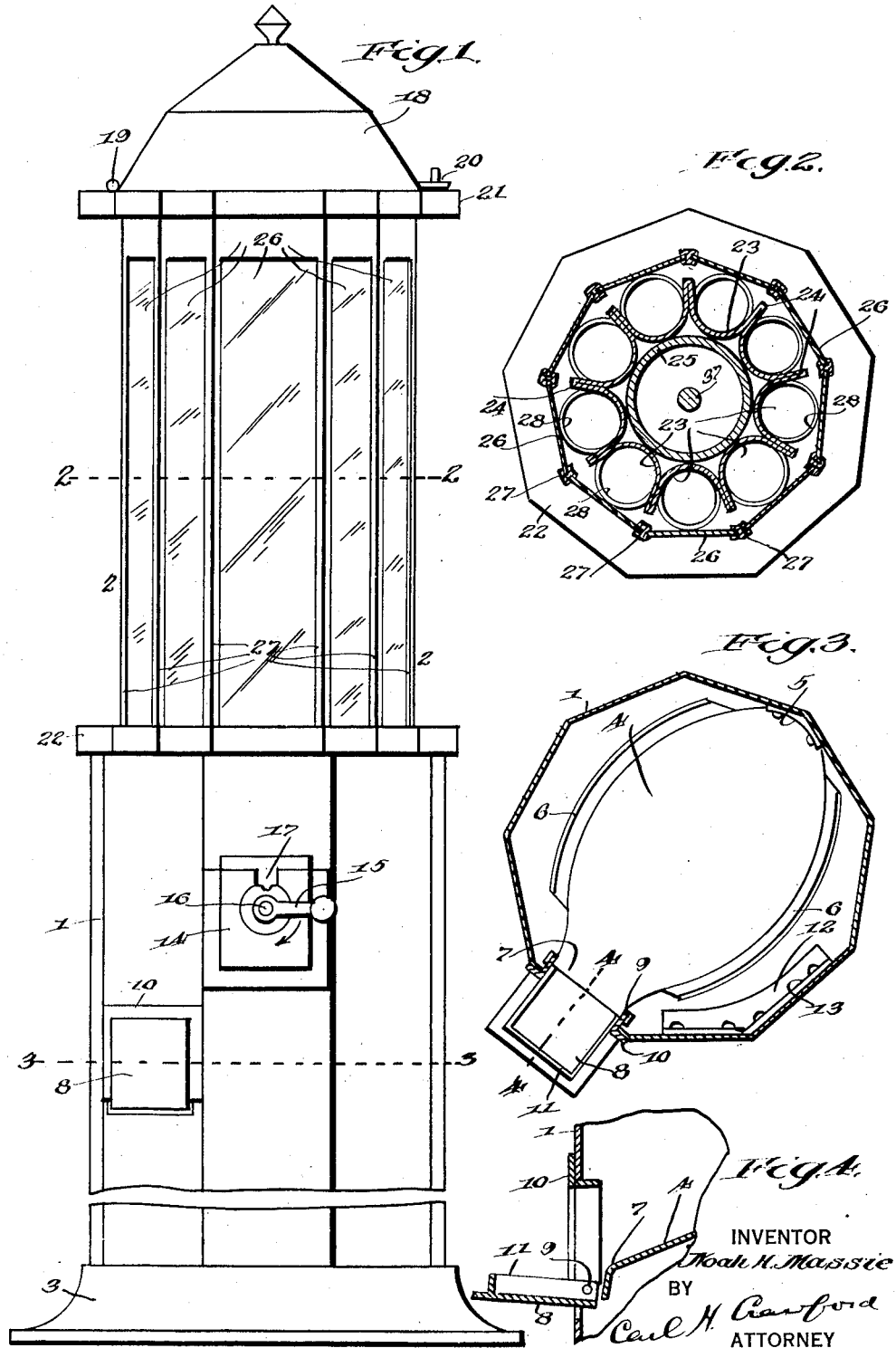

March 19, 1929.   N. H. MASSIE   1,705,936
FRUIT VENDING MACHINE
Filed Dec. 13, 1927   3 Sheets-Sheet 2
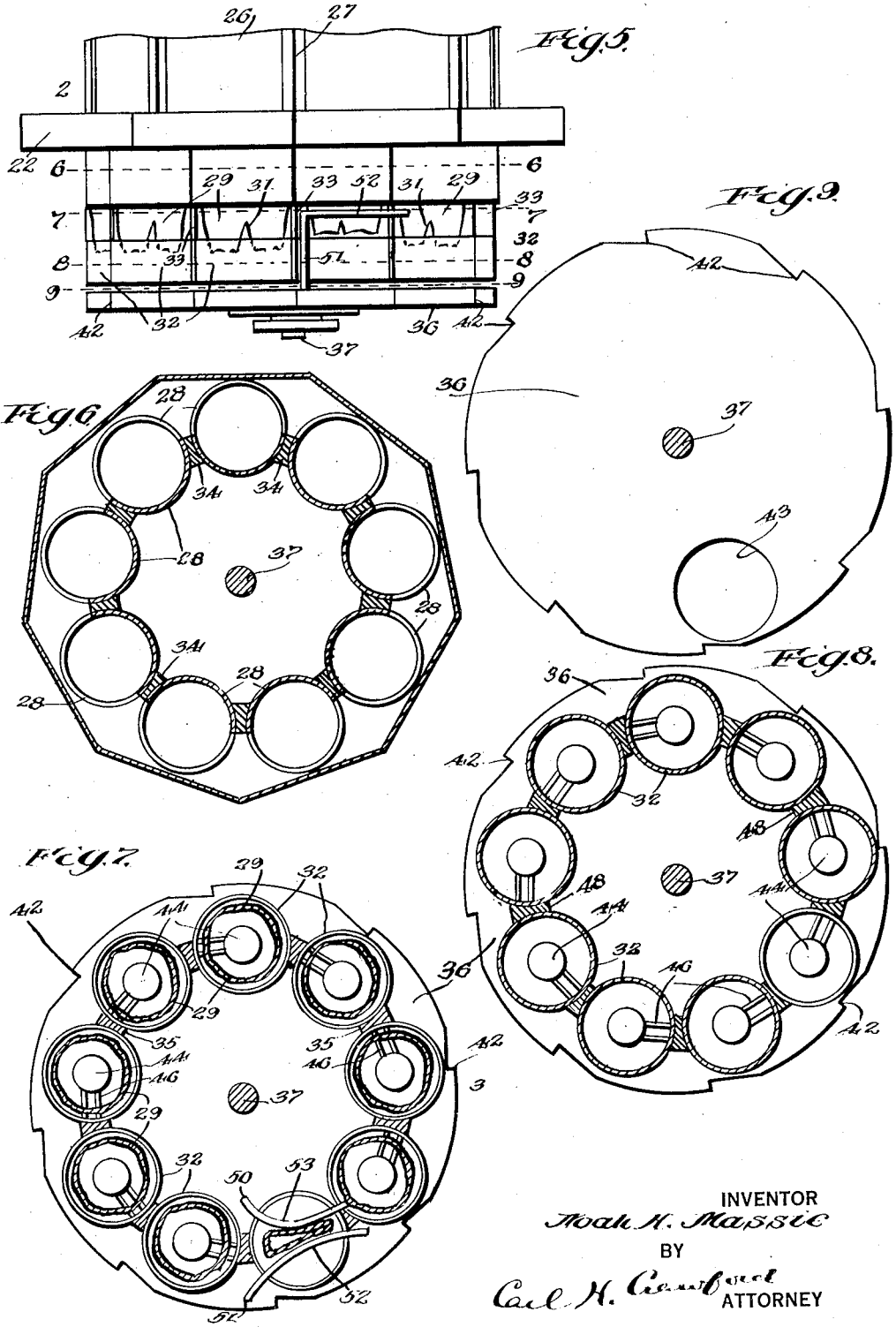
INVENTOR
Noah H. Massie
BY
Carl H. Crumbart
ATTORNEY March 19, 1929.  N. H. MASSIE  1,705,936
FRUIT VENDING MACHINE
Filed Dec. 13, 1927  3 Sheets-Sheet 3
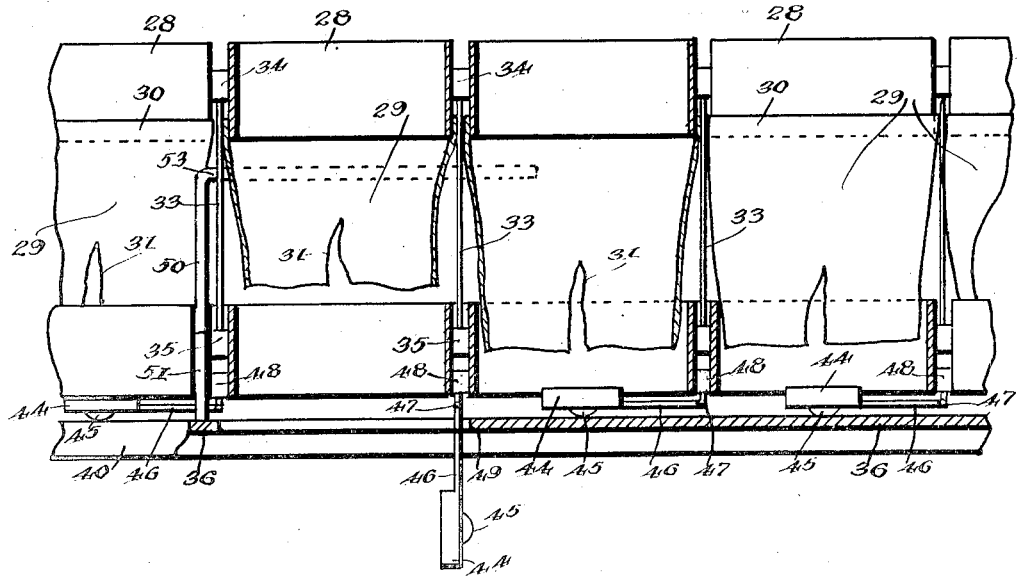
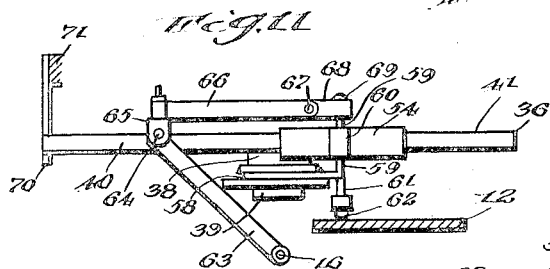
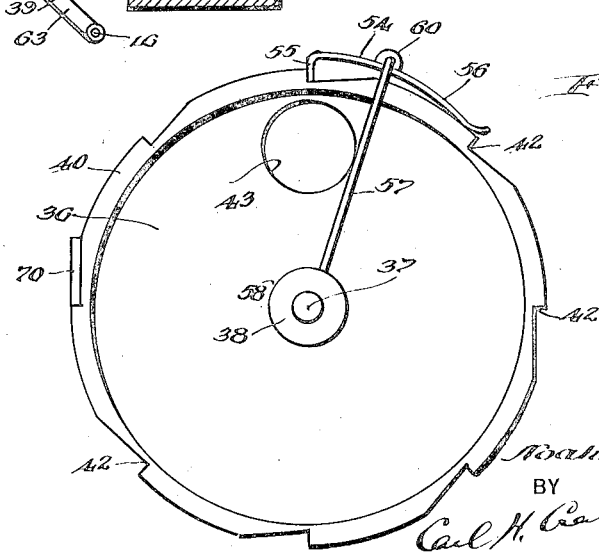
INVENTOR
Noah H. Massie
BY
Carl H. Crawford
ATTORNEY Patented Mar. 19, 1929.

1,705,936

UNITED STATES PATENT OFFICE.

NOAH H. MASSIE, OF YAKIMA, WASHINGTON, ASSIGNOR TO APPLE VENDER COMPANY, OF YAKIMA, WASHINGTON, A CORPORATION OF WASHINGTON.

FRUIT-VENDING MACHINE.

Application filed December 13, 1927. Serial No. 239,709.

The object of this invention is to provide a machine which is especially adapted to vending apples, oranges and like contour fruit.

In accordance with my invention, the fruit entities are disposed in superimposed relation and in columnar form and delivery is made from the lowermost entities of the several columns, preferably successively, as regards the columns, so that repeated deliveries will cause discharge substantially uniformly from all the columns.

It is a feature of my invention to provide delivery mechanism which normally functions to support all the columnar fruit entities from the lowermost entity thereof.

A further feature, in connection with the foregoing, is to provide the delivery mechanism with means for automatically supporting all the uppermost entities above the lowermost entity, from which column a delivery is to be made, thereby freeing the lowest entity for discharge.

In the most improved embodiment, the superimposed fruit entities are enclosed in columnar housings each of which is provided with a collapsible section which not only protects the fruit while the column thereof is being supported but which readily expands when released to permit the fruit column to settle after its lowermost entity has been discharged.

It is a further feature to provide a delivery mechanism having a discharge or delivery opening that is successively brought into registry with the several columnar housings, each housing being provided with a fruit supporting element that is actuated and sustained to support the fruit column until such delivery opening is brought into registry therewith, whereupon, such fruit supporting element or device is allowed to swing or move out of a supporting position until a delivery is made and is thereafter actuated by said mechanism into a restored fruit supporting position.

My invention includes many other features and objects which will be more fully described in connection with the accompanying drawings and which will be more particularly pointed out in and by the appended claims.

In the drawings;

Fig. 1, is a view in elevation of the preferred form of my vending machine.

Fig. 2, is a sectional view on line 2—2 of Fig. 1.

Fig. 3, is a sectional view on line 3—3 of Fig. 1.

Fig. 4, is a fragmentary sectional view on line 4—4 of Fig. 3.

Fig. 5, is a view in elevation of the delivery portion of my machine with the lower casing omitted.

Fig. 6, is a sectional view on line 6—6 of Fig. 5.

Fig. 7, is a sectional view on line 7—7 of Fig. 5.

Fig. 8, is a sectional view on line 8—8 of Fig. 5.

Fig. 9, is a sectional view on line 9—9 of Fig. 5.

Fig. 10, is an enlarged sectional view on line 10—10 of Fig. 7.

Fig. 11, is an edge view of a portion of the delivery mechanism showing one means of actuating the same and holding it in an actuated position.

Fig. 12, is a view looking from below Fig. 11.

Like characters of reference designate similar parts throughout the different figures of the drawings.

The device of my invention is herein shown embodied in a lower supporting casing generally indicated at 1 and an upper vending structure 2 superimposed on said casing 1. The lower casing or stand 1, is shown to be polygonal in cross section, the same having nine sides and being provided with a suitable base 3. In this stand, I have shown means for delivering the fruit to the consumer and said means includes an apron 4, that is anchored at 5, to the casing 1. This apron 4, is inclined at a proper angle for efficient gravity delivery and is laterally flanged at 6, to guide the fruit toward the discharge end 7, of the apron. A vending door 8, is shown hinged at 9, to the bottom of a door frame 10, and opens downwardly as shown in Fig. 4, and closes when swung upwardly, as shown in Fig. 1. Thus the door 8 swings about a substantially horizontal axis and hence acts as a receiver for the fruit entities that are discharged therein. To render the door efficient as a receiver, I provide the same with upstanding flanges 11, which not only prevent the fruit from rolling off from the door 8, when the latter is in an open or receiving position, but which also functions to coact with the frame 10, when in a closed position, to secure an alined closure. After a consumer has actuated the mechanism, as will be presently described, he will open the door 8, manually, to obtain his purchase.

On the inside of casing 1, I have shown a pawl supporting track 12, of segmental form, the same having a flange 13, that is suitably secured to the casing 1, as shown, the purpose of this track being hereinafter more fully described.

A coin controlled slot device is mounted on the casing 1, and is generally indicated at 14, and will not be described in detail as it does not specifically pertain to this invention. However, it is of the type which is actuated by a crank 15, mounted on a shaft 16, and I employ this shaft 16, as shown more fully in Fig. 11, as an actuating means for a pawl device that will be subsequently described. It may be stated that the crank 15, is designed to be turned in a clockwise direction, viewing Fig. 1, for a portion of a revolution, and then returned to the position shown, after a suitable coin or token has been deposited in slot 17, with which said device is provided.

Reference will next be made to the vending structure, or what might more properly be termed the storage portion of the device.

I will not describe the storage portion in detail as regards its particular fabrication but only in so far as the claims are addressed thereto, as it would be mere mechanical skill to construct this portion in many ways, in view of the disclosure herein made. Said storage portion has a top 18, that may be hinged at 19, and suitably locked at 20. Said storage portion 2, is provided with an upper structural rim 21, and a like lower rim 22, the latter forming a flange that rests upon the upper edge of the stand casing 1. The storage portion 2 is generally cylindrical but in cross section it is specifically polygonal, the same having nine sides, although this is merely an arbitrary specific form. Provision is made, as shown at 23, for nine vertically disposed columnar housings in which fruit such as apples or oranges may be stacked in superimposed relation to form fruit columns, the flanges 24, of said housings extending radially outwardly as shown in Fig. 2. These housings may be supported or built around a central tube or pipe 25, in any desired manner. The housings are arranged, in the form shown, to open radially outwardly or peripherally, in a manner to expose the contents to clear inspection of the consumer and to protect the fruit, I employ glass or like plates 26, one in front of each housing. These plates may be mounted in frame bars 27, as clearly shown, and the device may be charged from the top when the cover 18 is opened.

Reference will next be made to the manner and means whereby delivery of fruit is effected from the storage portion to the apron 4.

Referring more particularly to Figs. 5 to 10, each housing or container 23 is provided with a lower discharge end portion which is preferably tubular, as shown at 28, and with which its respective housing 23 is contiguous. One of the main functions of these discharge ends is to form a guide for the descending fruit entities serving to correctly position them for discharge, or to hold said entities in position while the lowermost entity is being discharged.

Pendent from, and preferably hung from each discharge end is a flexible sleeve 29, the upper margin 30 of which may be suitably secured to its respective discharge end 28. As all of these devices are alike in structure and function, only one of the nine thereof, need be described in detail. These sleeves 29, are free at their lower ends and for purposes of facilitating an advantageous operation, which will be later described, I preferably slit these flexible sleeves as shown at 31, which feature greatly aids in obtaining a quick and smooth contraction and affords an equally free and unrestrained recoil to a normal position.

In subjacent relation to each of said sleeves 29, is disposed what I will term a fruit receiver 32. These receivers 32 are shown to be tubular and of substantially the same internal diameter as the discharge ends 28 and they may be of substantially the same height. These receivers are preferably although not necessarily disposed a distance below the discharge ends slightly in excess of the major diameter of fruit passing therethrough, for a purpose that will presently appear, and they are open at both ends. I have shown the receivers 32 rigidly suspended in alined relation below the discharge ends 28, by means of bars 33, that are suitably anchored at 34, to the discharge ends 28, and at 35, to the receivers 32.

It may now be informative to state that the storage section 2, is stationary, in this specific disclosure, and likewise the discharge ends 28, the sleeves 29 and the receivers 32. Either the discharge ends 28, or their housings 23, inclusive, together with the sleeves 29 and receivers 32, may be considered as columnar housings for holding fruit in superimposed relation. Further, the sleeves 29, may be considered as intermediate collapsing or collapsible sections of such housings.

Reference will next be made to my improved delivery mechanism and attention may be directed to Figs. 5 to 10.

An important feature of this mechanism is a movable plate which, in the present construction, is in the form of a disc 36, adapted to be intermittently rotated about a pendent shaft 37, which is anchored in any suitable manner to the structure of the storage section 2. Said disc 36 is shown provided with a hub 38 projecting therebelow, and a collar 39, secured to shaft 37, forms a suitable end thrust bearing for rotatably supporting disc 36. Said disc 36 is shown provided with a peripheral flange 40, depending from the upper face 41, of said disc, and I have shown nine ratchet teeth 42, formed in said flange. A delivery opening 43, is provided in said disc and this opening is radially disposed to register with the several receivers 32, and is preferably slightly larger in diameter than the internal diameter of any of said receivers.

Before entering into a description of the means for intermittently moving said disc to successively bring opening 43 into registry with the several receivers, I will first describe the novel coaction of the delivery disc with the receivers, and with the collapsible sections.

In the absence of delivery of fruit, each fruit column is supported from its lower end, by its lowermost entity, indirectly through the agency of the delivery disc. However, in view of the fact that the fruit columns do not rotate, and the disc does, means is interposed between the two for the performance of this novel function. As shown, each receiver is provided with such means and as all are alike in structure and function, only one need be described in detail.

Referring to Fig. 10, I will designate the fruit column supporting device or abutment at 44, the same having or being of disc form in this specific instance. I have shown the device provided with an anti-friction ball 45, which is adapted to ride or roll on the upper face 41, of disc 36, said device 44 being in such radial relation to said disc that its supporting engagement by the latter will be interrupted by the opening 43. Said device is herein shown mounted on an arm 46, that is hinged at 47 to a lug 48, mounted on and between adjacent receivers 32. The direction in which the disc 36, is always actuated, is indicated by the arrow shown in Fig. 10, and it will be noted that the disposition of the hinge 47 is in following relation to the drag imposed by whatever friction is imposed on disc 36, as a result of engagement of device 44, therewith. In other words, this disposition is such that the arm 46, will be under slight tension. When the opening 43, reaches a fruit column from which a delivery is to be made, it permits the device 44 to descend by gravity, and by the weight of the superimposed fruit entity, into the position shown in the second column of Fig. 10, wherein the lowest entity has descended through said opening 43. Now as the disc 36, or when said disc 36, is advanced to the next fruit column to the left of Fig. 10, the wall portion 49, of opening 36, will engage arm 46 and gradually restore the device 44 into a fruit supporting position as shown in the last two columns of Fig. 10, to the right thereof. However, it will be understood that after the disc has been moved to a delivery position, as shown in Fig. 10, it will remain in such position until the next vending movement of said disc takes place.

I will next refer to the novel means functioning to prevent all the superimposed fruit entities from descending through opening 43, while a delivery is made therethrough of the single lowermost entity.

As will be seen by reference to Figs. 7 and 10, said means takes the form, in this specific instance, of a pair of upright spring wires 50 and 51, which are suitably mounted on disc 36 and extend upwardly therefrom to a point near the top of the flexible sections 29, or in any event, above the lowermost fruit entity, and preferably between the lowermost entity and the next uppermost adjacent entity. Wires 50 and 51, respectively, have horizontally and rearwardly projecting extensions 52 and 53, which are curved inwardly toward each other, as will be seen in Fig. 7, to form a converging throat, and the rear free ends of which are disposed in spaced relation, as shown. These extensions 52 and 53, will be termed contracting or supporting sections, and it will be noted that they are disposed above the opening 43, and extend forwardly and rearwardly in overhanging relation thereto. In practice, the disposition of these sections 52 and 53 is such that before the opening 43 reaches a delivery position in registry with a receiver 32, said sections will contract the corresponding sleeve 29, at a suitable point between the lowermost entity and the next uppermost entity, and segregate or divide the same, by contracting the sleeve 29. Further, while the sleeve 29 is held contracted, the column of fruit above the lowermost entity is supported against descent downwardly through opening 43. The flexible section 29, functions to cushion the action of said sections 52 and 53 and is interposed between said sections and the fruit engaged thereby protecting the fruit from injury. I have shown in Fig. 10, how lateral contraction of section 29, shortens the same, and it will now be clear that by slitting the sections 29, as indicated at 31, I greatly facilitate the ability of the latter to contract and subsequently be restored to a normal position. It will also be seen that the sections 52 and 53 extend far enough rearwardly to hold the fruit column until the disc 36 has restored the device 44 into a fruit supporting position, whereupon, the column of fruit will settle or descend onto said device. As the fruit settles, it will expand section 29 to normal again, and because of the subjacent alined relation of the receivers 32, with the discharge ends 28, the fruit is bound to descend in registry with said receivers.

I will next describe the novel means for intermittently moving, or in the present case, rotating the delivery plate.

A pawl is indicated at 54, the same having a pawl end 55 adapted for engagement with teeth 42, I preferably make the pawl of spring metal and provide the same with a tail portion 56, that rides on the periphery of disc 36 and has an outwardly bowed form, as shown in Fig. 11. A guide rod 57, which in this case is radially disposed, has its inner end 58 swivelled on hub 38, and its outer end 59, extended through a sleeve 60, on said pawl. This guide rod maintains the pawl 54 under compressive tension to keep the pawl end 55 and tail portion 56 in relatively close engagement with the disc 36. Thus, as the pawl 54, is shifted to the right of the position shown in Fig. 12, the pawl end 55 will ride upwardly or outwardly on the periphery thereby increasing the tension of the pawl, and when it reaches the next tooth 42, to the right, it will snap into the same with an effective engagement. In order to support the pawl 54, in its oscillating movement, I provide the same with a downward extension 61, which may be equipped with an anti-friction ball 62, adapted to ride on track 12, which is shown in Figs. 3 and 11. The coin device crank shaft 16, has secured thereto an arm 63, which is pivoted at 64, to a connecting joint 65, that is in turn swiveled to a connecting bar 66. Said bar 66, is in turn pivoted at 67 to a connecting joint 68 that is swiveled at 69, to rod section 59. Thus, as the crank 15, is turned in a clockwise direction, viewing Fig. 1, for a portion of a revolution, the pawl 54 is shifted into engagement with the next tooth 42, to the right of that tooth with which the pawl is shown engaged in Fig. 12. Then, as the crank is returned to the position shown in Fig. 12, the plate 36 will have been moved to advance the opening 43, from one receiver to another. In order to prevent the plate 36 from being turned when the pawl 54 is retracted, I provide a spring keeper 70, which may be mounted at 71 to any convenient stationary part, and which will function to prevent the disc 36 from rotating in a clock-wise direction, viewing Fig. 12, but will permit it to be rotated in a contra-clockwise direction. The keeper 70, may have enough tension to very effectively act as a drag to prevent "over feeding movement" of the disc 36, by said pawl 54, in case the crank 15, is very suddenly returned to a starting position.

It is believed that the device of my invention will be fully understood from the foregoing description, and while I have herein-shown one specific form of my invention, I do not wish to be limited thereto except for such limitations as the claims may import.

I claim:

1. In a fruit vending machine, a stationary and generally cylindrical structure provided with a series of peripherally disposed and vertically arranged columnar containers each adapted to contain a column of fruit entities in superposed relation for gravity descent therein, and each container terminating at its lower portion in a tubular discharge end portion opening downwardly, said structure including a series of fruit receivers one for each discharge end portion and in subjacent alinement therewith and in spaced relation thereto slightly in excess of the major diameter of the maximum sized fruit to be vended, a collapsible separating sleeve hung from each discharge end portion and extending into the corresponding receiver thereof, a delivery disc plate rotatable below said receivers and having a delivery opening adapted to successively register with one of said receivers, a fruit column separator on said plate abreast of said opening for collapsing a sleeve to support the uppermost entities of a fruit column in separated relation with the lowermost entity thereof to be discharged, and each receiver having a fruit supporting device provided with an anti-friction ball adapted to ride on said plate and supporting a column of fruit, said support being hinged to its receiver to drop through said opening to release an entity and coacting with a wall portion of said opening to be restored to a supporting position as said plate is advanced and before said separator has released the fruit column from which a delivery has been made, and means for imparting intermittent rotary motion to said plate in one direction to bring said opening into successive registry with each of said receivers.

2. In a fruit vending machine, a stationary structure provided with a series of vertically arranged columnar containers each adapted to contain a column of fruit entities in superimposed relation for gravity descent therein, each container having a discharge portion at its lower end opening downwardly, said structure including a series of receivers one for each discharge portion and in subjacent spaced alinement with the latter, a collapsible separating sleeve hung from each discharge portion and extending into the corresponding receiver thereof, a delivery plate movable below said receivers and having a delivery opening for individual registry with said receivers, a fruit column separating device on said plate abreast of said opening for collapsing a sleeve to support uppermost entities of a fruit column in separated relation with the lowermost entity thereof whereby the latter may be discharged, and each receiver having a fruit supporting device adapted to ride on said plate and support a column of fruit prior to discharge thereof, said supporting device being coactively actuated by said opening to descend and permit discharge of fruit through said opening and be restored to a supporting position by said opening, and means for imparting movement to said plate to advance the opening therein into discharging relation with said receivers.

3. In a fruit vending machine, a series of discharge portions each adapted to be supplied with a supply of fruit, a corresponding series of receivers in alined subjacent spaced relation with respect to said discharge portions, a collapsible separating sleeve hung from each discharge portion and extending downwardly into a corresponding receiver, a delivery plate movable below said receivers and having a delivery opening, means carried by said plate for collapsing a sleeve between the lowermost and next uppermost fruit entities to support the latter while the lowermost entity is discharged through said opening.

4. In a fruit vending machine, a movable delivery plate, a series of fruit receivers in delivering relation to said plate, a device in each receiver for supporting the fruit therein and having means riding on said plate to sustain the device in a fruit supporting position, and said plate having a fruit delivery opening for individual registry with said receivers to release the fruit supporting devices therefrom and permit discharge of fruit from such receiver through said opening.

5. In a fruit vending machine, an intermittently movable delivery plate adapted to be advanced in one general direction, a series of fruit receivers opening downwardly for delivery onto said plate, each receiver having a fruit supporting device therein and hinged thereto in a manner to extend from its hinge in a direction similar to the direction of advancing movement of said plate, and said plate having a delivery opening for individual registery with said receivers to release the device thereof for descent downwardly through said opening and gravity discharge of a fruit entity therethrough while said plate is at rest, a wall portion of said opening engaging and restoring said device to a fruit supporting position in said receiver and on said plate as the latter is advanced.

6. In a fruit vending machine, a delivery plate adapted to be intermittently advance, a series of fruit receivers opening downwardly onto said plate, said plate having an opening therethrough for individual registry with said receivers for discharge of a fruit entity therethrough from a registering receiver, and means coacting with said plate for normally supporting fruit entities in said receivers and permitting discharge of entities therefrom.

7. In a fruit vending machine, a series of columnar housings for enclosing columns of fruit entities in superimposed relation and having lower discharge ends, each housing having an intermediate collapsible section, and delivery mechanism for supporting the columns of fruit entities near the discharge ends, said mechanism having means for contracting a collapsible section of that column from which a delivery is to be made to support uppermost entities while the lowermost entity is being discharged.

8. In a fruit vending machine, a series of columnar housings for enclosing columns of fruit entities in superimposed relation and having lower discharge ends, each housing having an intermediate collapsible section, and mechanism for supporting the columns of fruit from the lowermost entity, said mechanism having means comprising inwardly curved yielding wires for contracting a collapsible section of that column from which a delivery of the lowermost entity is to be made to support the remaining uppermost entities while the lowermost is being discharged.

9. In a fruit vending machine, a delivery disc provided with a delivery opening and having peripherally disposed ratchet teeth, means for supplying fruit to be delivered one at a time through said opening, a spring pawl having a pawl portion and a tail portion for engagement with said periphery, means for holding said pawl in compression engagement with the periphery of said disc, and means for reciprocating said pawl to intermittently advance said disc successively into new delivery positions.

10. In a fruit vending machine, a columnar housing for enclosing a column of fruit entities in superimposed relation and having a lower collapsible section, and means for collapsing said section between the lowermost and next lowermost entity to release the former and support the remaining entities of the column.

11. In a fruit vending machine, a columnar housing for enclosing a column of fruit entities in superimposed relation and having a lower collapsible section, and yielding means for collapsing said section between the lowermost and next lowermost entity to release the former and support the remaining entities of the column.

In witness whereof I have hereunto set my hand.

NOAH H. MASSIE.